Feb. 14, 1950     C. A. KALLGREN     2,497,776
COTTON PICKER SPINDLE
Filed Sept. 25, 1944     2 Sheets-Sheet 1
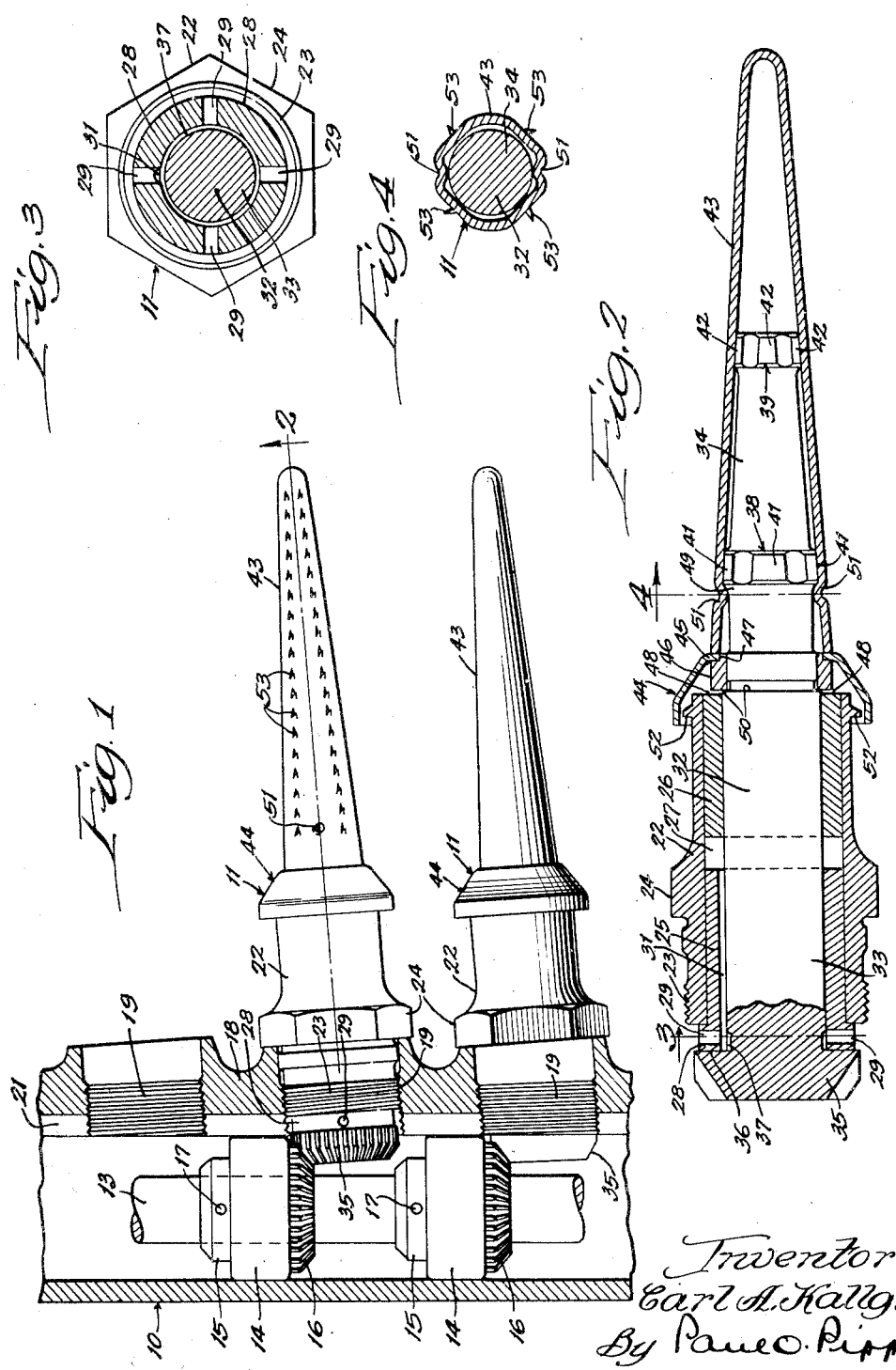
Inventor:
Carl A. Kallgren
By Paul O. Pippel
Attorney.

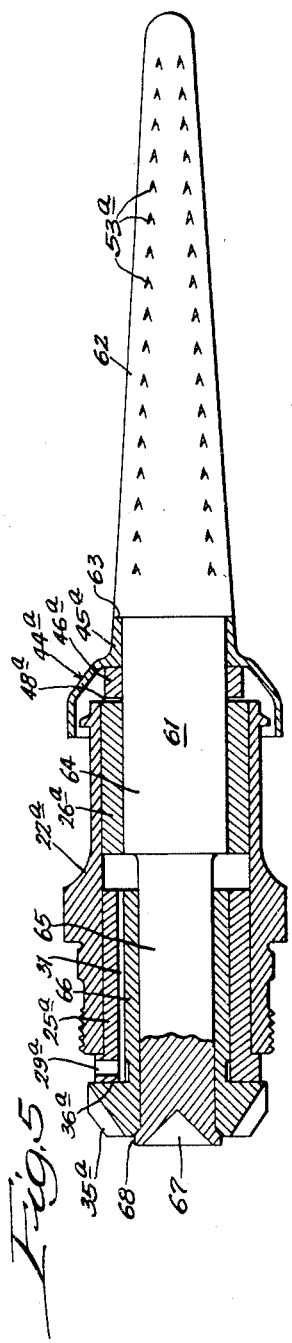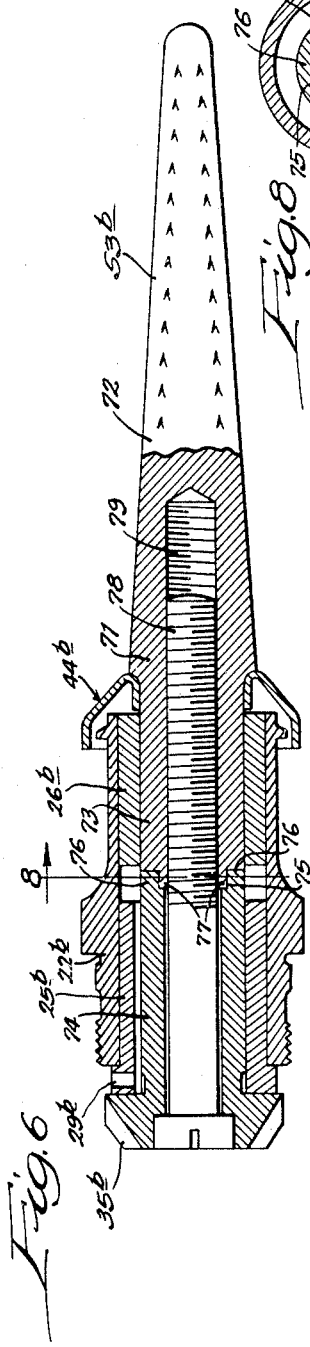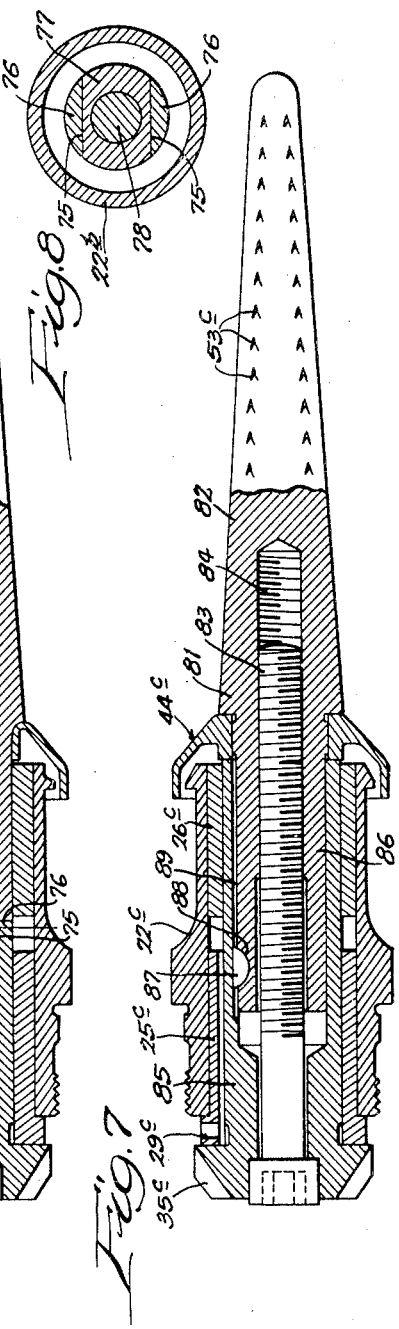

Patented Feb. 14, 1950

2,497,776

UNITED STATES PATENT OFFICE 2,497,776

COTTON PICKER SPINDLE

Carl A. Kallgren, Chicago, Ill., assignor to International Harvester Company, a corporation of New Jersey Application September 25, 1944, Serial No. 555,664

9 Claims. (Cl. 56—50)

This invention has to do with spindles employed in cotton picking machines and relates more particularly to an assembly of such a spindle with a journal support therefor.

The picker spindle assemblies of the present invention are adaptable for use interchangeably with those used in a cotton picking unit of the character disclosed in U. S. Patent No. 2,140,631. These spindles, which rotate, have crop clutching portions which are barbed to enable them to better grasp the cotton fibers of matured bolls preparatory to winding the cotton thereonto and extracting it from the pods or bolls. When these barbs are sharp at their points the spindles are much more aggressive in gathering the crop, so, as the barbs wear dull in use it ultimately becomes necessary to replace the barb-carrying parts of the spindles. An object of this invention is the provision of an improved spindle assembly wherein the barbs are formed upon a conveniently replaceable portion thereof which can be economically produced. The saving by such an improvement in the time and expense required for changing a set of spindles is very appreciable since there are 600 spindles in the larger units now produced.

During operation of the picking unit the spindles are continuously rotated and are cyclically projected into and withdrawn from the plant row. Another object of the invention is the provision of an improved spindle bearing insuring adequate lubrication for these constantly rotating spindles and capable of withstanding sidewise thrust sometimes imparted thereto when projected against thick plant stalks or unnoticed foreign objects in the plant row.

Another object is the provision of a spindle assembly with a rugged support for the replaceable barb carrying portion whereby this portion has ample resistance to impairment by the aforesaid sidewise thrust.

Still another object is the provision of a novel guard member upon the spindle for excluding cotton lint, dust and moisture from its bearing.

The above and other desirable objects inherent in and encompassed by the invention will be better understood after reading the ensuing description with reference to the annexed two sheets of drawings, wherein:

Fig. 1 is a vertical sectional view taken through a spindle carrier bar containing driving means for spindle assemblies carried thereon and showing such spindle assemblies in side elevation;

Fig. 2 is a longitudinal sectional view taken through the spindle assembly shown in Fig. 1, upon the line 2 in that figure, said view illustrating a preferred spindle assembly constructed according to the principles of this invention;

Fig. 3 is a transverse sectional view taken on the line 3 of Fig. 2;

Fig. 4 is a transverse sectional view taken on the line 4 of Fig. 2;

Figs. 5, 6, and 7 are views similar to Fig. 2 but illustrating respective modified embodiments of the invention; and Fig. 8 is a transverse sectional view taken on the line 8 of Fig. 6.

With continued reference to the drawings, and particularly to Figure 1, a section of a spindle carrier member or bar 10 is there illustrated with two spindle assemblies 11. This spindle carrier 10 is but one of several of such members embodied in a cotton picking unit as that shown in the above mentioned U. S. Patent No. 2,140,631. Some existing machines employ a cotton picking unit having fifteen of the bar-like carrier members 10, and each of these members 10 in such units is of a length to carry twenty of the spindle assemblies 11. During operation of the picking unit the bar-like carriers 10, while maintained in an upright position, are revolved about a closed horizontal path whereby the spindles, as 11, of each bar are projected into the cotton plant row during traversal of one portion of the path, withdrawn from the cotton plant row during traversal of another portion of the path, carried past a doffing mechanism for brushing the picked cotton from the spindles during their traversal of another portion of the path, and subjected to a moistening apparatus for moistening the spindles in a final portion of the path preparatory to again being projected into the cotton plant row in commencing a succeeding cycle.

Each bar-like spindle assembly carrying member 10 encloses a drive shaft 13 supported upon bearing units 14. These bearing units 14 are disposed about the hubs 15 of spindle driving gears 16 secured by means of pins 17 for rotation with the shaft 13. The outer wall 18 of each spindle carrying member 10 has vertically spaced spindle-assembly holding or attachment sections in the form of threaded openings 19, respectively, for the spindle assemblies 11. These openings 19 are intersected by a vertical groove 21 which constitutes lubricant supply means for the spindle assembly bearings as will presently become apparent. Oil is fed into the grooves 21 by a lubricant metering device, not shown.

Each of the spindle assemblies 11 includes a hollow spindle holder member 22 having an exterior threaded section 23 at its inner end and a faceted section 24 for engagement by a wrench to facilitate screwing of the threaded section 23 into the threads of one of the holes 19 in the carrier bar 10. The spindle holding means 22 includes axially spaced bearing sleeves 25 and 26, respectively, at the inner and outer ends of such hollow holding means and axially separated at a mid-portion of such holding means to form an oil-receiving chamber 27. The inner bearing sleeve member 25 has a radial flange 28 and this flange has radial passages 29 for conducting oil into the bearing from the carrier bar channel 21. An axle groove 31 within the sleeve 25 conducts oil from the passages 29 into the oil reservoir 27. A spindle 32 is inserted into the holder 22, outer end foremost, through the inner end opening of said holder to journal a shank 33 of the spindle in the sleeve-like bearing members 25 and 26 while projecting a picker sleeve supporting portion 34 outwardly of said holder. A gear 35 formed integrally with each spindle 32 is adapted to have its outermost face 36 bear against the associated bearing flange 28. When the holder 22 is screwed into the carrier member opening 19 therefor, the gear 35 will be advanced into mesh with its associated or companion gear 16. Adjacently to its gear 35, each spindle is provided with a circumferential groove 37 which provides communication between the axial bearing sleeve channel 31 and those of the oil conducting passages 29 which are out of radial registry with such groove 31.

The picker sleeve supporting portion 34 on the spindle of the illustrated spindle assembly, with which the other assemblies are identical, is provided with two radially enlarged faceted sections 38 and 39 having flat faces 41 and 42 engaging the inner sides of a picker spindle sleeve 43 which is polygonal in cross-section as illustrated in Figure 3. These faceted sections 38 and 39 provide lateral support for the sleeve 43 and also prevent relative rotation between such sleeve and the spindle 32.

This sleeve 43 and a dust and moisture guard member 44 are assembled with the spindle 32 after the latter has been inserted through the holder 22. Said guard member is a generally conically shaped pressed steel structure having a hub 45 assembled with a spacer ring 46 at an annular shoulder 47 formed in the outer end of such ring. The hub 45 and ring 46 may be joined together, if desired, but whether the parts 45 and 46 are joined together or not, when they are assembled into the spindle structure the ring 46 constitutes a portion of the hub for the guard member 44 and serves as means for limiting displacement of the guard axially of the spindle structure.

The inner end of the ring or hub member 46 abuts against a shoulder 50 on the spindle to provide a slight clearance, indicated at 48, between this member 46 and the outer end of the bearing sleeve 26. This clearance 48 is in the neighborhood of two or three thousandths of an inch, whereby said ring 46 and the outer face 36 of the gear 35 limit a slight endwise play of the spindle shank within the bearing means of the holder 22.

A peripherally contoured picker-sleeve coupling section 49 is formed upon the picker-sleeve holding portion 34 of the spindle and cooperates with deformations 51 effected in the sleeve 43 for retaining this sleeve and the guard 44 upon the spindle in the positions illustrated.

Copious lubrication of the bearing means 25—26 throughout its length from the inner to the outer ends of the holder 22 is insured by the oil conducting channel means 29—37—31—27. It will also be noted that this bearing means has a substantial diameter and is quite long so as to receive a large diameter and correspondingly sturdy spindle 32. Lateral or sidewise thrusts, which are sometimes imparted to the outwardly projecting crop clutching portion of the spindle, are thus capable of effective absorption by the holder 22 and the bearing means associated therewith.

The guard 44, in addition to resisting dust and water penetrating the bearing from its outer end, also prevents cotton fibers collecting in such a fashion upon the spindle adjacent the holder 22 that would rub thereagainst and offer appreciable resistance to spindle rotation. A rib 52 circumscribing the outer end of the holder 22 and closely embraced by the guard 44, to leave a space preferably not more than two or three thousandths of an inch between this rib and the guard member, is particularly effective in excluding the moisture. Moisture exclusion is an important factor in view of the water supplied to the spindles once during each revolution of the spindle carrier bars 10. The narrowness of this rib axially of the holder 22 minimizes the area therebetween and the guard and correspondingly minimizes the spindle braking effect of any cotton fibers tending to pack into this area.

Another advantage of the present structure is in the detachable character of the sleeve 43. This portion 43 of the spindle 32 is provided with barbs 53 for grasping the cotton fibers to facilitate winding of these fibers into the spindles preparatory to their extraction from the bolls. It is essential for the barbs 53 to be sharp at their points so they will give the spindle the aggressiveness desired in grasping the cotton. After the points on the barbs 53 are dulled in use, the spindle must be serviced by replacing the barb-bearing portion. Employment of the sleeve 43 which is detachably associated with the spindle portion 34 leads to an economy, since only a small portion of the rotatable spindle part need be discarded. There is a further advantage in employing the barb-bearing sleeve 43, namely, that this sleeve is hollow, whereby the weight of the projecting part of the spindle structure is minimized, reducing the inertia of the rotatable parts and thereby placing less starting load upon the engine and the driving connections between the engine and the picker unit.

In the modification shown in Fig. 5, many of the elements are identical with or correspond to elements in the above described embodiment, and to expedite this description these elements will simply be designated by the same reference characters as in Figs. 1 to 4, but with the latter "a" added. The Fig. 5 form of the invention employs a barb-bearing portion 62 formed integrally with the spindle 61. A shoulder 63 between the barb-bearing portion 62 of the spindle and its shank serves as an abutment for the hub 45a of the guard member 44a. A reduced diameter portion 65 of the spindle shank is supported in an axial extension 66 of the gear 35a and a cavity 67 in the left end of the spindle, Figure 5, expedites the peening over of a flange 68 for maintaining the gear 35a assembled with the spindle. A spacer member 46a between the guard hub 45a and the right end of the bearing sleeve 26a of the holder 22a cooperates with the outer face 36a of the gear 35a in providing a slight clearance 48a, permitting limited axial movement of the rotatable parts of the spindle structure relatively to the holder 22a. Gear hub extension 66 is journaled in the bearing sleeve 25a.

The modification in Fig. 6 is very similar to that in Fig. 5, wherefore the reference characters designating parts corresponding to or identical with those shown in Figs. 1 to 4 are designated by the same respective characters with the suffix "b." As in the Fig. 5 embodiment, the solid spindle 71 has the barb-bearing portion 72 formed integrally therewith. The shank 73 of the spindle 71 is journaled in the bearing sleeve 26b. The gear 35b has a hub extension 74 with a transverse slot 75 at its right end, Figure 6, forming studs 76 (see Fig. 8) which engage the opposite flattened faces of a center boss 77 on the inner or left end of the spindle 71. This engagement of the parts 76 and 77 serves to transmit rotative force from the gear to the spindle. Assembly of the gear and spindle is maintained by a long machine screw 78 extending through the gear extension 74 into threaded relation with a recess 79 in the spindle 71.

The embodiment of the invention shown in Fig. 7, which is similar to that in Fig. 6, also has its elements identical with or corresponding to those shown in Figs. 1 to 4, designated by the same respective reference characters but with the suffix letter "c." In this form, the spindle 81 also has the barbs 53c formed integrally with its crop engaging portion 82. A machine screw 83 corresponding to the machine screw 78 in Fig. 6 is turned into a threaded recess 84 in the spindle 81 for retaining the spindle and the gear 35c in assembly. In this arrangement, the hub extension 85 of the gear 35c is journaled in both of the bearing sleeves 25c and 26c and is telescoped with the shank of the spindle 81. Relative rotation between the gear extension 85 and the spindle shank 86 is prevented by a Woodruff key 87 seated in a slot 88 in the spindle shank and projecting into a key-way 89 in the gear hub extension.

Having thus described the preferred embodiments of the invention, I claim:

1. In a cotton picker spindle assembly for use upon a spindle carrier having a holding section for retention of the assembly upon the carrier and having a spindle driving gear and oil supply means associated therewith; the combination of a hollow spindle-holder having outer and inner ends and disposable in said holding section for retention therein, bearing means in the holder, said bearing means including bearing sleeves at the respective ends of the holder, said sleeves being spaced axially apart to form an oil receiving space, the bearing sleeve at the inner end of the holder having an outwardly directed radial flange adjacently to such inner end of the holder, a spindle structure having a shank portion journaled in said sleeves and a crop clutching portion projecting outwardly from the outer end of the holder, a gear on the inner end of said spindle structure for meshing with the spindle driving gear and receiving oil from said oil supply means while the holder is retained in the carrier holding section, oil duct means comprising radial channels in said flange and spaced circumferentially thereabout, a channel circumscribing the spindle structure at the inner ends of the radial channels and a channel extending axially of the spindle structure communicatively between the circumscribing channel and the oil receiving space.

2. In a cotton picker spindle assembly for use upon a spindle carrier having an attachment section for such assembly and an oil supply means associated therewith; the combination of a hollow spindle-holder having outer and inner ends and attachable to said attachment section, and bearing means for rotatively supporting a spindle in said holder, said bearing means including bearing sleeves at the respective ends of the holder, said sleeves being spaced axially apart to form an oil receiving space, the bearing sleeve at the inner end of the holder having an outwardly directed radial flange adjacently to such inner end of the holder and oil duct means communicative with said oil supply means comprising radial channels in said flange and distributed circumferentially thereabout, annular channel means embraced by said flange and arranged coaxially therewith in communication with said radial channels, and a channel extending axially of the inner bearing sleeve communicative between the annular channel means and the oil receiving space.

3. In a cotton picker spindle assembly for use upon a spindle carrier having an attachment section for such assembly and a spindle driving gear associated therewith; the combination of a hollow spindle-holder having outer and inner ends and attachable to said attachment section, bearing means in said holder, a spindle having an inner end shank portion and an outer end picker sleeve supporting portion, a spindle gear upon the inner end of the spindle, said spindle being endwise insertable through the bearing means from the inner end of the holder, sleeve supporting end portion foremost, to project such sleeve supporting end portion outwardly from the holder outer end and to place the spindle shank portion in journaled relation in said bearing means while the gear is disposed adjacently to the inner end of the holder for meshing with said spindle driving gear, a dust guard member disposed about the spindle adjacently to the outer end of the holder and operable to limit axial movement of the spindle inwardly of the holder when such guard member is held against displacement endwise outwardly of the spindle, a picker sleeve capping the spindle sleeve supporting portion, and common means for resisting displacement of said guard member and said picker sleeve endwise outwardly from the outer end of the spindle.

4. In a cotton picker spindle assembly for use upon a spindle carrier having an attachment section for such assembly and a spindle driving gear and an oil supply means associated therewith; the combination of a hollow spindle-holder with inner and outer ends and attachable to said attachment section, bearing means in said holder comprising a bearing sleeve with a radially outwardly directed flange adjacently to the inner end of the holder, a spindle having an inner end shank portion and an outer end picker sleeve supporting portion, a gear upon the inner end of the spindle, said spindle being insertable through the bearing means from the inner end of the holder, outer end foremost, to place the shank in journaled relation with said bearing means, a face of said gear being thus disposed for reaction against the bearing sleeve flange to limit outward endwise movement of the spindle while the gear is also disposed for meshing with the spindle driving gear, stop means exceeding the inside diameter of the bearing means and slidable onto the spindle over its outer end to limit endwise displacement of the spindle inwardly of the holder, a picker sleeve on the picker sleeve support, and means preventing endwise displacement of the picker sleeve from the spindle, and said picker sleeve being thus rendered operable to prevent endwise displacement of said stop means.

5. In a cotton picker spindle assembly, a hollow spindle-holder having inner and outer ends, a spindle having an inner end shank portion journaled in said holder and an outer end picker sleeve supporting portion projecting outwardly from the outer end of said holder, a gear formed integrally with the inner end of the spindle and reactable against the inner end of the holder to limit endwise outward movement of the spindle in the holder, said spindle being adapted for assembly with said holder by insertion, outer end foremost, through the inner end of such holder, the sleeve holding portion of the spindle having a contoured peripheral picker-sleeve coupling section, a picker sleeve telescoped onto the sleeve holding portion over its outer end, and a section on said sleeve being deformed to interlock with said spindle coupling section to resist endwise displacement of the sleeve from the spindle and to capacitate said sleeve as a reaction member for imposing force against the holder to limit axial movement of the spindle endwise inwardly of the holder.

6. In a cotton picker spindle assembly, a hollow spindle-holder having open inner and outer ends, a spindle structure having a shank portion projected inwardly through the outer end of said holder into journaled relation therewith, a gear adjacently to the inner end of the holder and having an extension projecting axially into the holder through said inner end into journaled relation therewith coaxially of the spindle, and means establishing a detachable driving connection between said gear hub and the spindle shank.

7. In a cotton picker spindle assembly, a hollow spindle-holder structure having open inner and outer ends, a spindle structure having a shank portion projected inwardly through the outer end of said holder, a gear adjacently to the inner end of said support and having an extension portion projecting axially into the holder through said inner end into coaxial telescopic relation with said shank portion, at least one of said coaxial portions bearing upon said holder structure in journaled relation therewith, and means connecting said gear and spindle structure for unitary rotation and for preventing their axial separation.

8. In a cotton picker spindle assembly, a hollow spindle-holder structure having open inner and outer ends, a spindle structure having a shank portion projected inwardly through the outer end of said holder, a gear adjacently to the inner end of said support and having a hub with an extension portion projecting axially into the holder through said inner end, said hub extension portion and said spindle shank portion being coaxial and each being journaled in said holder structure, means upon said portions for establishing a connection between the gear and the spindle structure to cause their rotation in unison, and a connecting member extending axially through the gear and its hub into connection with the spindle structure to prevent axial separation of the gear and spindle structure.

9. In a cotton picker spindle assembly, a hollow spindle-holder structure having open inner and outer ends, a spindle structure having a shank portion projected inwardly through the outer end of said holder, a gear adjacently to the inner end of said structure and having a hub with an extension portion projecting axially into the holder through said inner end, said hub extension being axially bored and journaled in said holder structure, said spindle shank portion projecting into the hub extension bore, means upon said portions for establishing a connection between the gear and the spindle structure to cause their rotation in unison, and a connetcing member extending axially through the gear and its hub into connection with the spindle structure to prevent axial separation of the gear and spindle structure.

CARL A. KALLGREN.

REFERENCES CITED

The following references are of record in the file of this patent:

UNITED STATES PATENTS

| Number | Name | Date |
|---|---|---|
| 63,543 | Marsh | Apr. 2, 1867 |
| 860,142 | Lispenard | July 16, 1907 |
| 877,754 | Bullock | Jan. 28, 1908 |
| 891,444 | Scherling | June 23, 1908 |
| 902,227 | Gray | Oct. 27, 1908 |
| 1,818,444 | Wirth | Aug. 11, 1931 |
| 1,926,337 | Johnston | Sept. 12, 1933 |
| 2,155,296 | Bornman | Apr. 18, 1939 |